United States Patent
VanTassel et al.

(10) Patent No.: US 10,550,710 B2
(45) Date of Patent: Feb. 4, 2020

(54) SHROUD FOR GAS TURBINE ENGINE

(71) Applicant: General Electric Company, Schenectady, NY (US)

(72) Inventors: Brad Wilson VanTassel, Easley, SC (US); Evan Andrew Sewall, Greer, SC (US); Travis J Packer, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 63 days.

(21) Appl. No.: 15/995,076

(22) Filed: May 31, 2018

(65) Prior Publication Data
US 2019/0368365 A1    Dec. 5, 2019

(51) Int. Cl.
*F01D 25/14*   (2006.01)
*F01D 11/08*   (2006.01)

(52) U.S. Cl.
CPC .............. *F01D 11/08* (2013.01); *F01D 25/14* (2013.01); *F05D 2220/32* (2013.01); *F05D 2240/11* (2013.01); *F05D 2250/184* (2013.01); *F05D 2260/204* (2013.01)

(58) Field of Classification Search
CPC .......... F01D 5/081; F01D 5/186; F01D 5/188; F01D 9/023; F01D 25/12; F01D 25/14; F05D 2260/204; F05D 2240/10; F05D 2240/11; F05D 2240/15; F05D 2250/184; F05D 220/32
See application file for complete search history.

(56) References Cited

U.S. PATENT DOCUMENTS

| | | | |
|---|---|---|---|
| 4,307,993 A | 12/1981 | Hartel | |
| 10,030,523 B2* | 7/2018 | Quach | F01D 5/187 |
| 10,087,778 B2* | 10/2018 | Didion | F01D 11/08 |
| 2013/0323033 A1* | 12/2013 | Lutjen | F01D 11/08 |
| | | | 415/173.1 |
| 2016/0160760 A1 | 6/2016 | Romanov et al. | |
| 2019/0211692 A1* | 7/2019 | Mongillo, Jr. | F01D 5/187 |
| 2019/0218925 A1* | 7/2019 | Garay | F01D 9/065 |

FOREIGN PATENT DOCUMENTS

EP    2549063 A1    1/2013

OTHER PUBLICATIONS

General Electric Company; International Patent Application No. PCT/US2019/033267; International Search Report; dated Aug. 14, 2019; (2 pages).

* cited by examiner

*Primary Examiner* — Jason D Shanske
*Assistant Examiner* — Sang K Kim
(74) *Attorney, Agent, or Firm* — Dority & Manning, P.A.

(57) ABSTRACT

A turbine shroud segment including: a target exterior surface and target interior region; and a cooling configuration having first and second channel types. The first channel type includes: an inlet and outlet; a target section extending through the target interior region; lateral ports spaced lengthwise between first and second ends of the target section; and a path within the target interior region offset from the target exterior surface by a minimum offset. The second channel type includes: dead-ends disposed at first and second ends; lateral ports connecting to lateral ports of the first channel type; and a path through the target interior region that is variable between valleys and peaks. The second channel type resides closer to the target exterior surface at the valleys than at the peaks. At each of the (Continued)

valleys, the second channel type resides within the minimum offset.

20 Claims, 8 Drawing Sheets

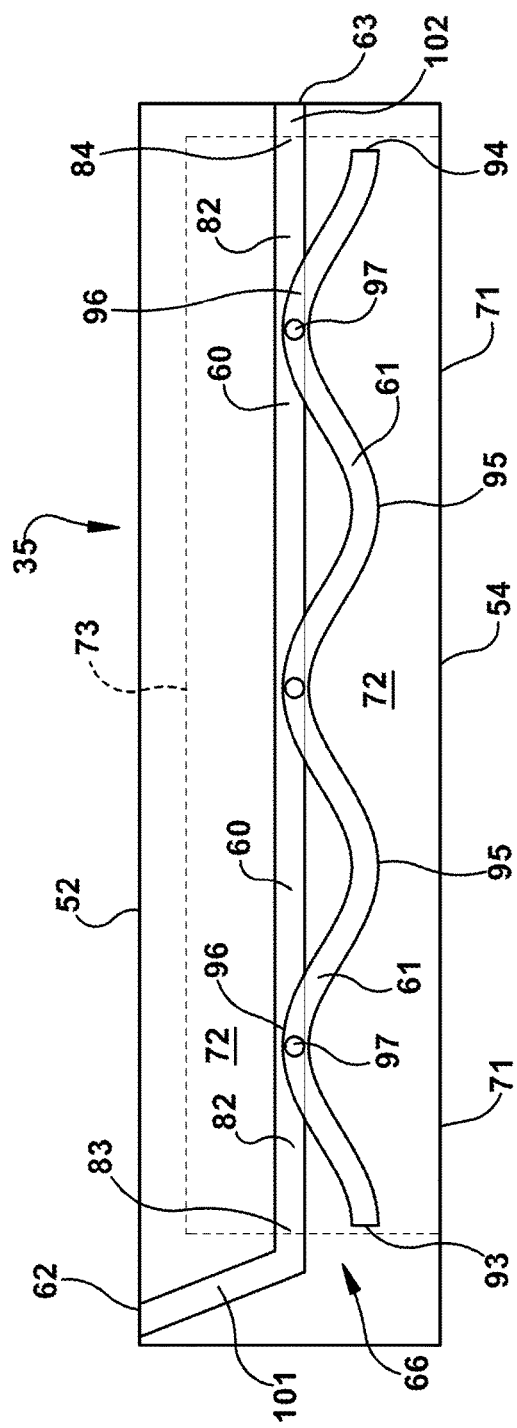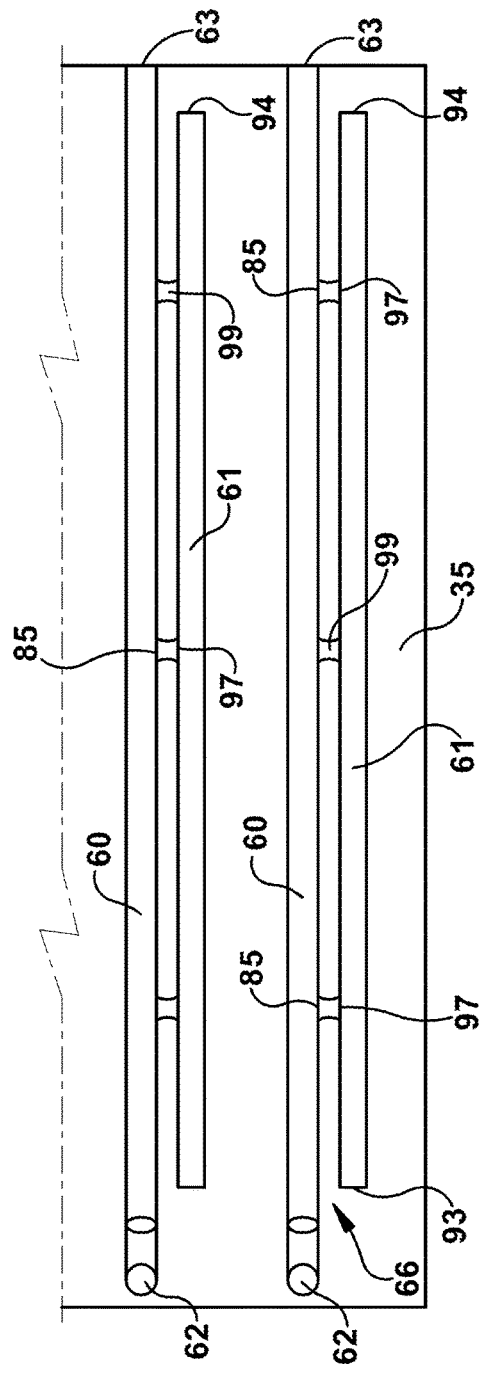

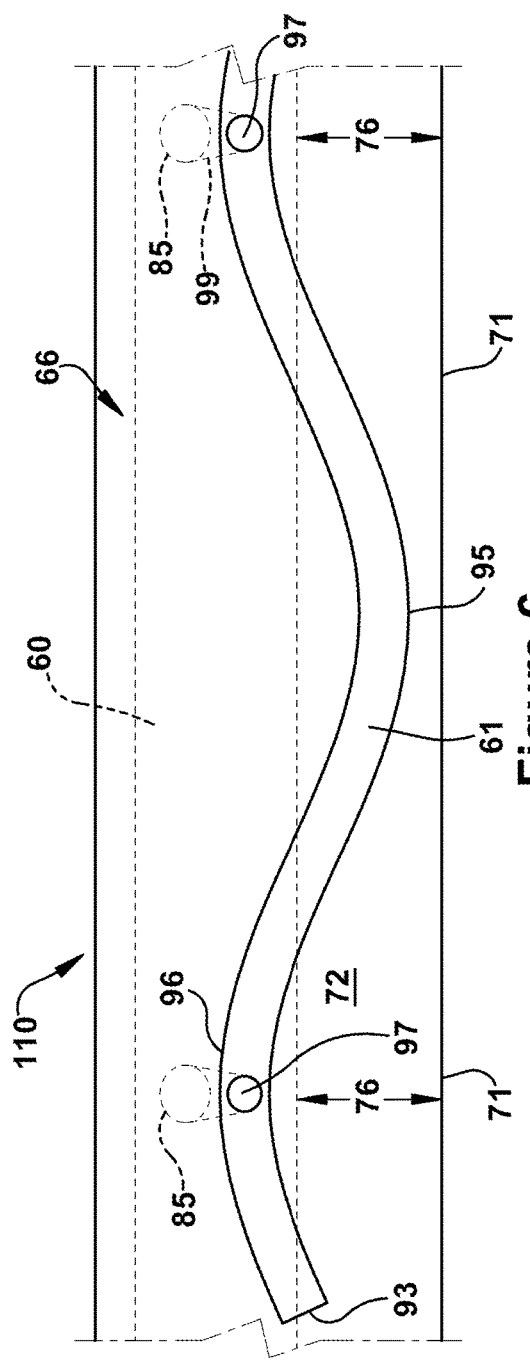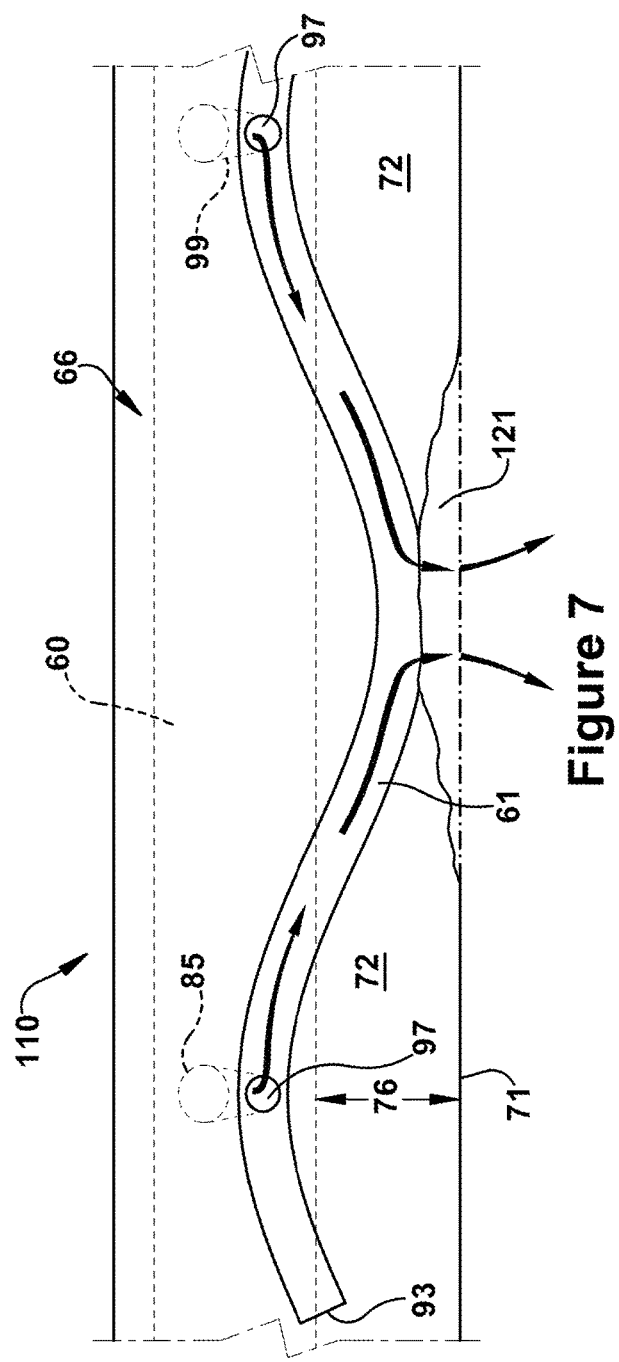

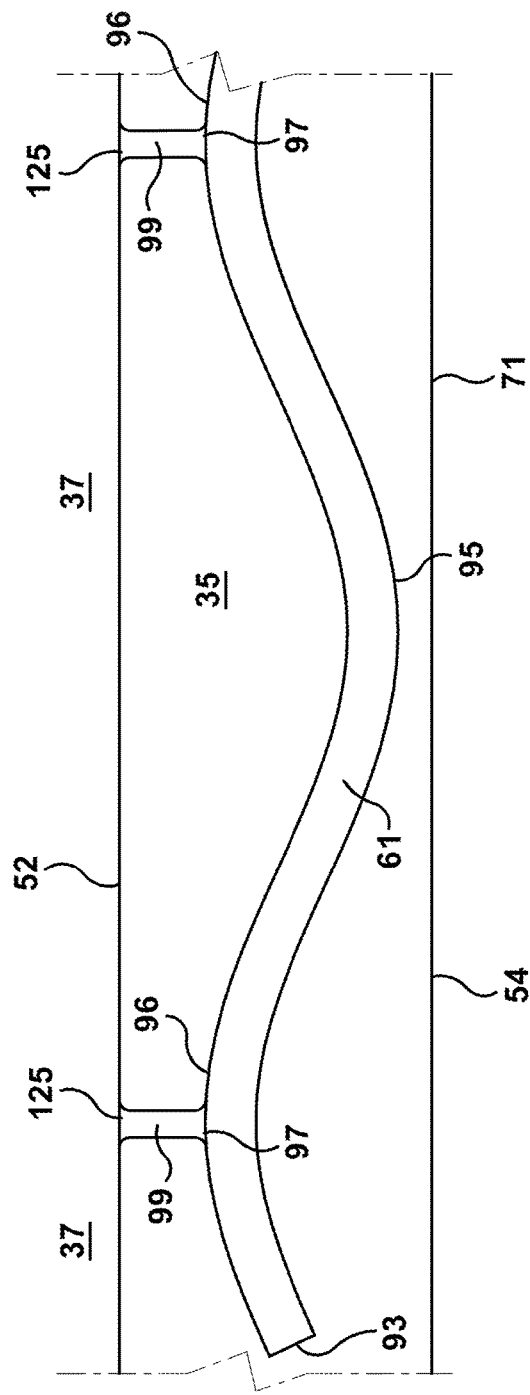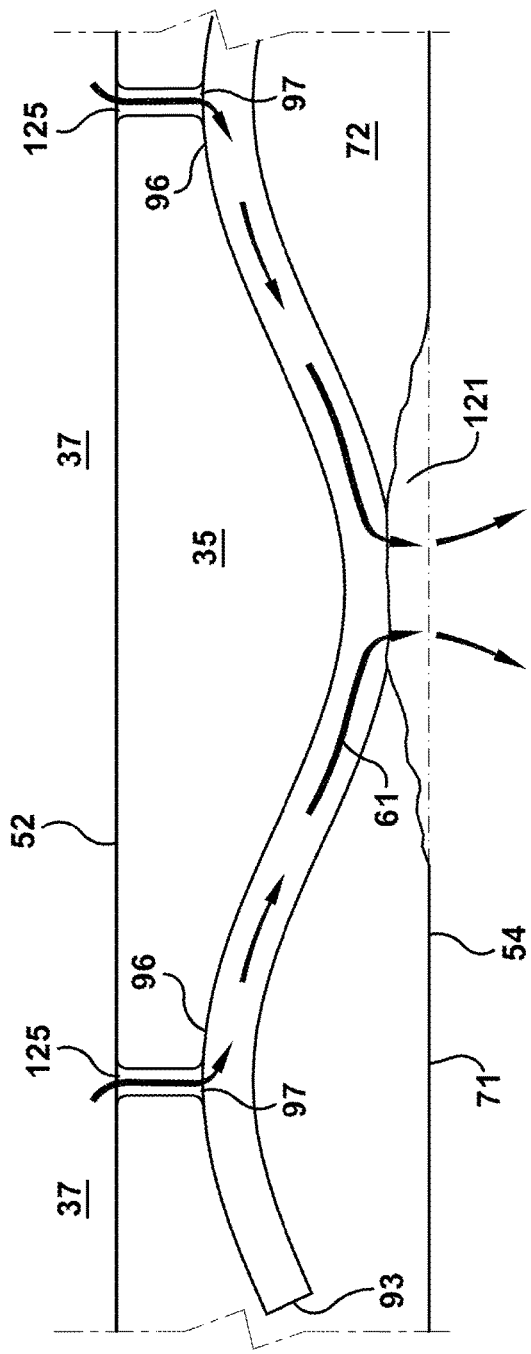

SHROUD FOR GAS TURBINE ENGINE

BACKGROUND OF THE INVENTION

The subject matter disclosed herein relates to hot gas path components within the turbine of a gas turbine engine, and, more specifically, but not by way of limitation, to the interior structure and cooling configuration of stationary shrouds formed about turbine rotor blades.

Gas turbine engines include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. Stationary shrouds may be constructed about the rotor blades to define a boundary of the hot gas path. The rotor blades are connected to a central shaft such that the rotation of the rotor blades rotates the shaft, and, in this manner, the energy of the fuel is converted into the mechanical energy of the rotating shaft, which, for example, may be used to rotate the rotor blades of the compressor, so to produce the supply of compressed air needed for combustion, as well as, rotate the coils of a generator so to generate electrical power. During operation, because of the high temperatures, velocity of the working fluid, and rotational velocity of the engine, many of the components within the hot gas path become highly stressed by extreme mechanical and thermal loads.

Many industrial applications, such as those involving power generation and aviation, still rely heavily on gas turbine engines, and because of this, the design of more efficient engines is an ongoing objective. Even incremental advances in machine performance, efficiency, or cost-effectiveness are meaningful in the competitive markets that have evolved around this technology. While there are several known strategies for improving the efficiency of gas turbines—for example, increasing the size of the engine, firing temperatures, or rotational velocities—each generally places additional strain on hot gas path components that are already highly stressed. As a result, there remains a general need for improved apparatus, methods or systems for alleviating such stresses or, alternatively, enhancing the durability of such components so they may better withstand them.

For example, extreme temperatures of the hot gas path stress stationary shrouds formed about rows of rotor blades, causing degradation and shortening the useful life of the component. Novel shroud designs are needed that optimize coolant efficiency, while also being cost-effective to construct, durable, and flexible in application. Specifically, shroud cooling strategies and internal configurations that maximize coolant effectiveness, structural robustness, part-life longevity, and engine efficiency represent valuable technology.

BRIEF DESCRIPTION OF THE INVENTION

The present application describes a hot gas path component for use in a turbine of a gas turbine engine. The hot gas component may include: a target exterior surface; an opposing exterior surface that opposes the target exterior surface across the hot gas path component; surface ports formed through the opposing exterior surface; a target interior region defined adjacent to the target exterior surface by a predetermined distance taken normal to the target exterior surface; and a cooling configuration that includes a second channel type. The second channel type may include: a non-continuous flow channel that extends lengthwise between a dead-end disposed at a first end and a dead-end disposed at a second end; lateral ports spaced lengthwise between the first end and the second end of the second channel type, the lateral ports of the second channel type connecting to respective ones of the surface ports; and a path defined through the target interior region that is variable between valleys and peaks that are spaced lengthwise between the first end and second end of the second channel type, wherein the second channel type resides closer to the target exterior surface at the valleys than the peaks.

The present application further describes a turbine of a gas turbine engine having an inner shroud segment that includes: a target exterior surface; a target interior region defined adjacent to the target exterior surface; and a cooling configuration that includes a channel pairing in which a first channel type is paired with a second channel type. The first channel type may include: a continuous flow channel that extends lengthwise between an inlet and an outlet; a target section that extends through and is disposed within the target interior region (where the target section of the first channel type extends lengthwise between a first end and a second end); and lateral ports spaced lengthwise between the first end and the second end of the target section. The first channel type may define a path within the target interior region that is offset from the target exterior surface by a distance that greater than a predetermined minimum offset. The second channel type may include: a non-continuous flow channel that extends lengthwise between a dead-end disposed at a first end and a dead-end disposed at a second end; and lateral ports spaced lengthwise between the first end and the second end of the second channel type. The lateral ports of the second channel type may connect to respective ones of the lateral ports of the first channel type. The second channel type may define a path within the target interior region that is variable between valleys and peaks that are spaced lengthwise between the first and second ends of the second channel type. The second channel type may reside closer to the target exterior surface at the valleys than at the peaks. At each of the valleys, the second channel type may reside a distance from the target exterior surface that is less than the predetermined minimum offset.

BRIEF DESCRIPTION OF THE DRAWINGS

These and other features of this disclosure will be more completely understood and appreciated by careful study of the following more detailed description of exemplary embodiments of the disclosure taken in conjunction with the accompanying drawings, in which:

FIG. 4 is side cross-sectional view of a simplified inner shroud segment that includes a cooling configuration in accordance with the present disclosure;

FIG. 5 is a top view of the shroud segment of FIG. 4;

FIG. 6 is an enhanced cross-sectional view of an inner shroud segment that has a cooling configuration in accordance with the present disclosure;

FIG. 7 is the cross-sectional view of the inner shroud segment of FIG. 6 illustrating a cooling configuration of the present invention during an exemplary operating condition;

FIG. 10 is a cross-sectional view of an inner shroud segment that has a cooling configuration in accordance with the present disclosure;

FIG. 11 is the cross-sectional view of the inner shroud segment of FIG. 10 illustrating a cooling configuration of the present invention during an exemplary operating condition.

DETAILED DESCRIPTION OF THE INVENTION

The present disclosure is directed to systems and methods for cooling components of a turbine, specifically, an inner shroud segment, disposed along a hot gas path. As will be seen, the inner shroud segment of the present invention includes a cooling configuration in which particular channels are formed within the interior of the inner shroud segment.

As used herein, "downstream" and "upstream" are terms that indicate a flow direction of a fluid through a channel or passage. Thus, for example, relative to the flow of working fluid through the turbine, the term "downstream" refers to a direction that generally corresponds to the direction of the flow, and the term "upstream" generally refers to the direction that is opposite of the direction of flow. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis.

Figure 1:
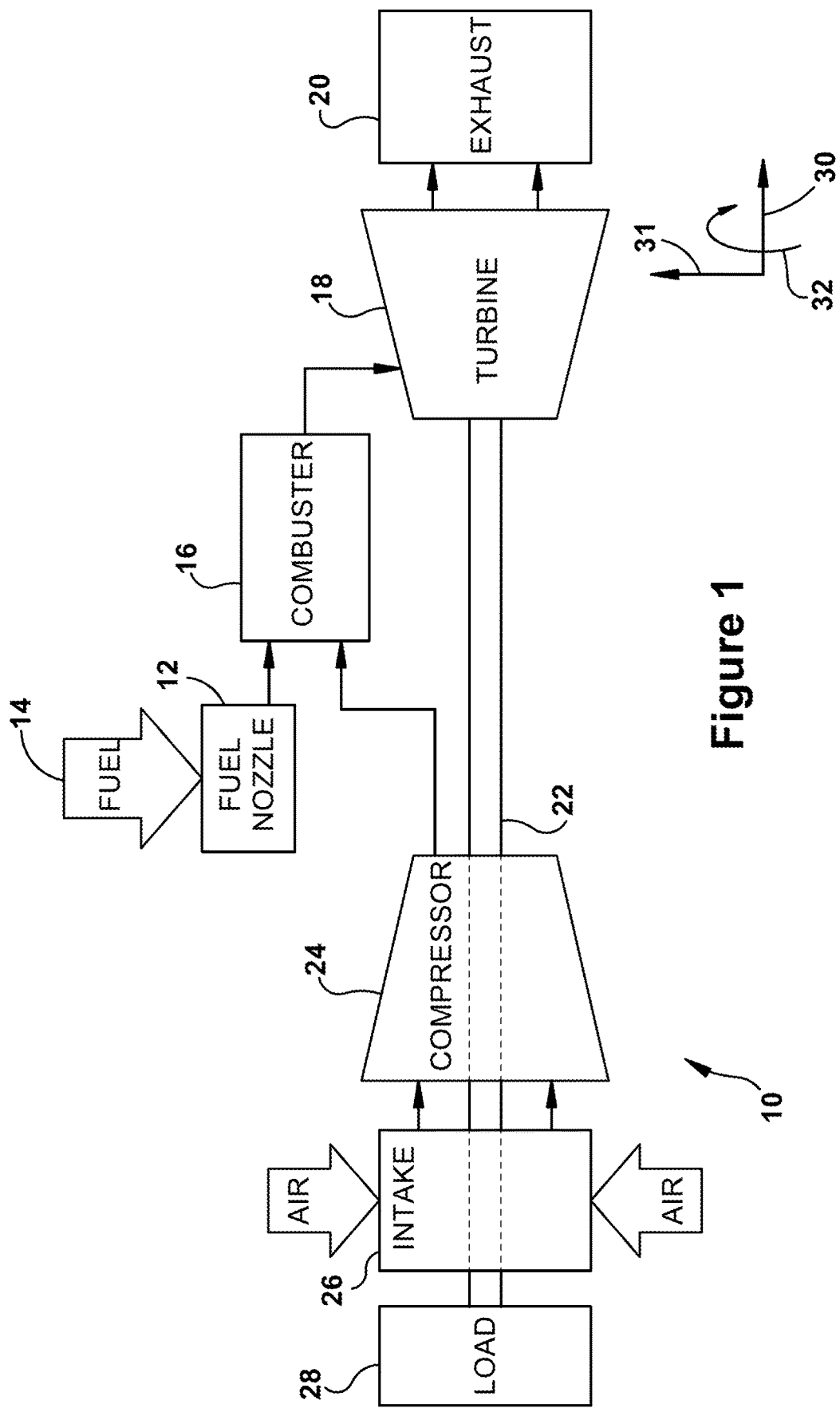
FIG. 1 is a block diagram of a gas turbine engine in which shrouds of the present disclosure may be used.

Turning to the drawings, FIG. 1 is a block diagram of a gas turbine system or engine (or "gas turbine") 10. As described in detail below, gas turbine 10 may employ shroud segments having cooling channels, which reduce stress modes in such hot gas path components and improve the efficiency of the engine. Gas turbine 10 may use liquid or gas fuel, such as natural gas and/or a hydrogen rich synthetic gas. As depicted, fuel nozzles 12 intake a fuel supply 14, mix the fuel with an oxidant, such as air, oxygen, oxygen-enriched air, oxygen reduced air, or any combination thereof. Once the fuel and air have been mixed, the fuel nozzles 12 distribute the fuel-air mixture into a combustor 16 in a suitable ratio for optimal combustion, emissions, fuel consumption, and power output.

Gas turbine 10 may include one or more fuel nozzles 12 located inside one or more combustors 16. The fuel-air mixture combusts in a chamber within combustor 16, thereby creating hot pressurized exhaust gases. Combustor 16 directs the exhaust gases (e.g., hot pressurized gas) through a transition piece into alternating rows of stationary stator blades and rotating rotor blades, which causes rotation of a turbine section or turbine 18 within a turbine casing. The exhaust gases expand through turbine 18 and flow toward an exhaust outlet 20. As the exhaust gases pass through turbine 18, the gases force the rotor blades to rotate a shaft 22. Shaft 22 may operably connected turbine 18 to a compressor 24. As will be appreciated, shaft 22 defines a center axis of gas turbine 10, e.g., turbine 18 and compressor 24. Relative to the center axis, an axial direction 30 is defined, which represents movement along the center axis, a radial direction 31 is defined, which represents movement toward or away from the center axis, and a circumferential direction 32 is defined, which represents movement around the center axis.

Compressor 24 also includes blades coupled to shaft 22. As shaft 22 rotates, the blades within compressor 24 also rotate, thereby compressing air from an air intake 26 through compressor 24 and into fuel nozzles 12 and/or combustor 16. A portion of the compressed air (e.g., discharged air) from compressor 24 may be diverted to turbine 18 or its components without passing through combustor 16. The discharged air may be utilized as a coolant to cool turbine components, such as shrouds and nozzles on the stator, along with rotor blades, disks, and spacers on the rotor. Shaft 22 may also be connected to a load 28, which may be a vehicle or a stationary load, such as a propeller on an aircraft or an electrical generator in a power plant.

Turbine 18 may include one or more shroud segments (e.g., inner shroud segments) having an internal cooling configuration (or "cooling configuration") that includes cooling passages for controlling temperature during operation. As will be seen, the cooling configuration of the present disclosure may be used to cool inner shroud segments efficiently, while also protecting the shroud against certain types of degradation by diverting portions of the cooling supply to regions where that degradation is beginning. In this way, the cooling configuration of the present disclosure may be used to reduce distress modes in hot gas path components, such as inner shroud segments, and, thereby, extend service life of the components by preventing or slowing the rate at which degradation progresses.

Figure 2:
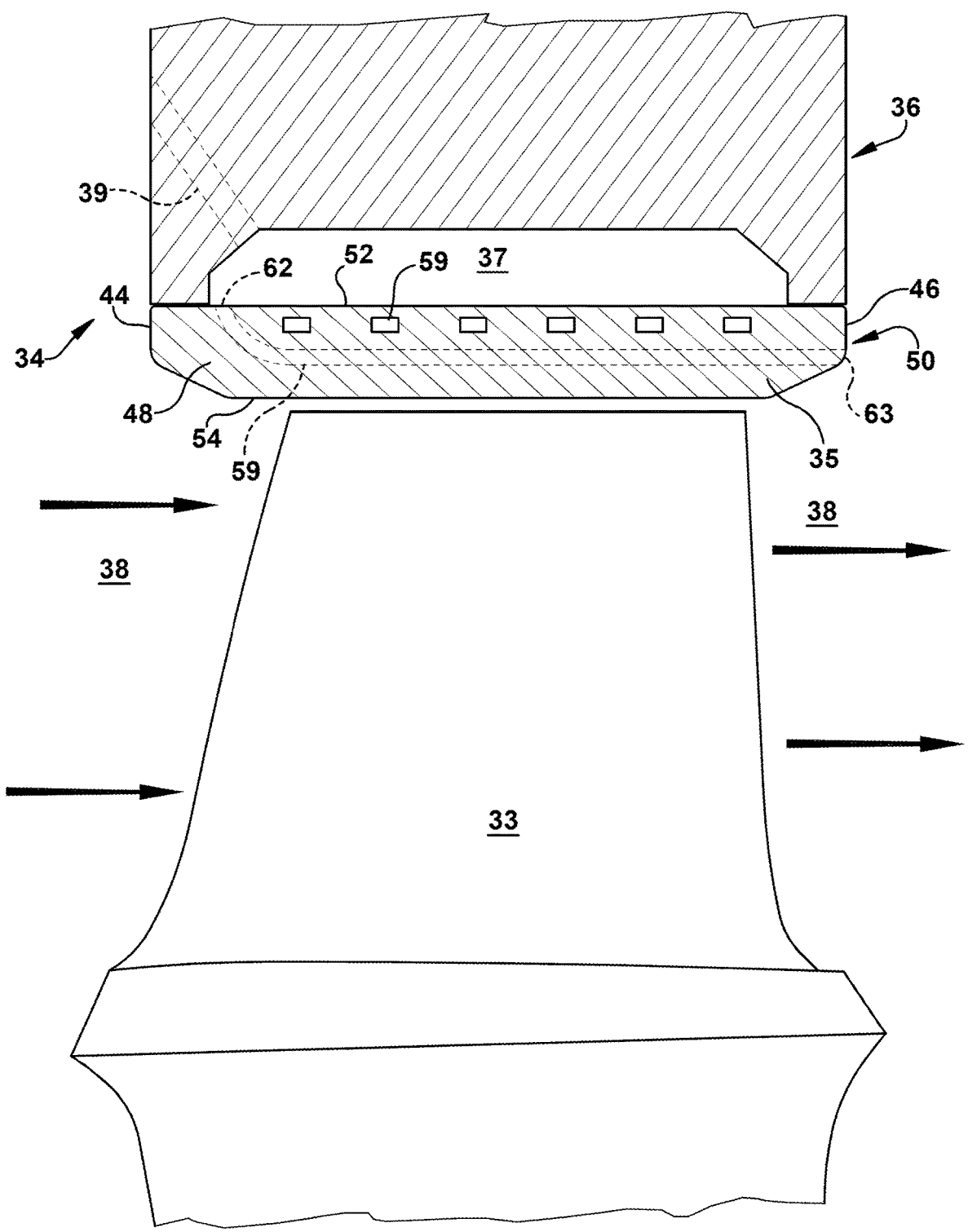
FIG. 2 is a side view of a hot gas path having a rotor blade and stationary shroud.
Figure 3:
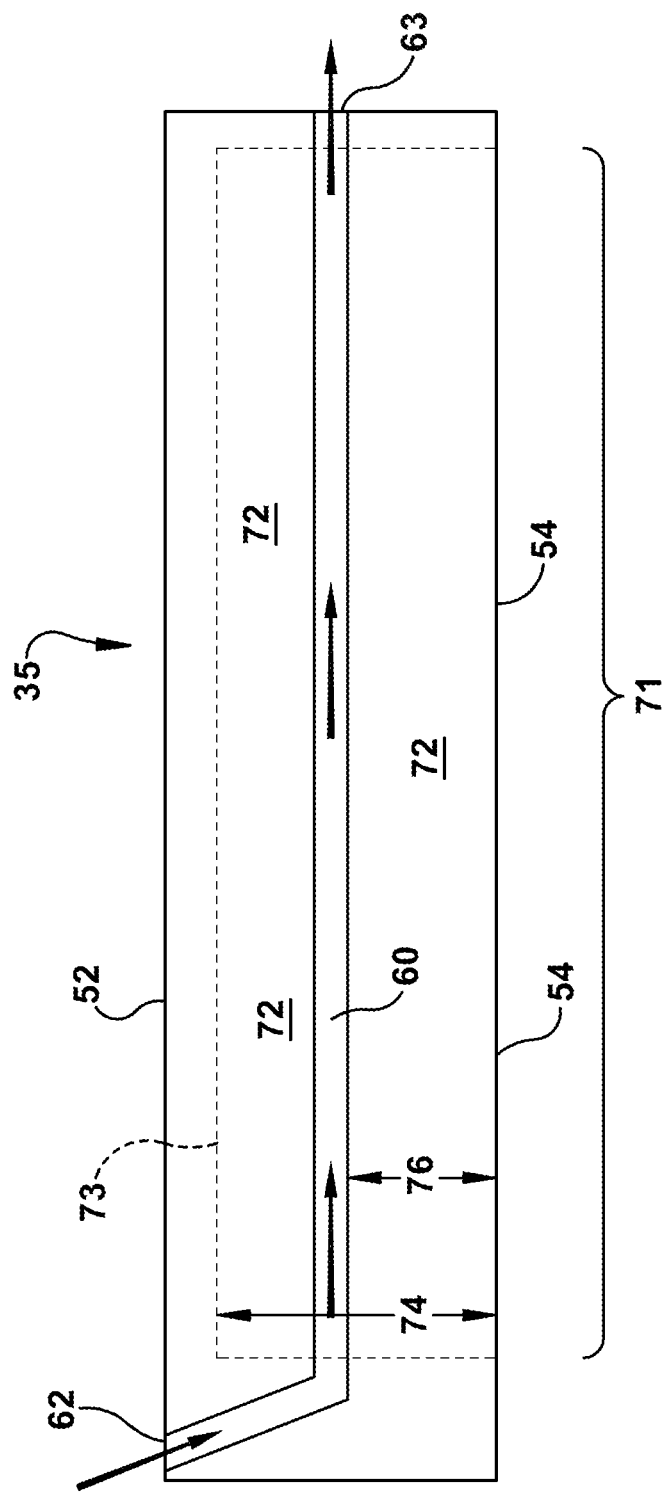
FIG. 3 is side cross-sectional view of a simplified inner shroud segment for describing embodiments of the present disclosure.

FIG. 2 shows an exemplary axial section of a hot gas path 38 as may be included within turbine 18 of a gas turbine. As shown, hot gas path 38 may include several hot gas path components, including a rotor blade 33 and stationary shroud segment 34. Rotor blade 33 may be part of a row of rotor blades, which may be disposed in serial flow relationship axially aft or downstream of a row of stationary turbine stator blades (not shown). Shroud segment 34 may be circumferentially disposed about and radially outward (or "outboard") of rotor blade 33. As illustrated, shroud segment 34 may include an inner shroud segment 35 that resides radially inward (or "inboard") of an outer shroud segment 36. A cavity 37 may be formed between inner and outer shroud segments 35, 36. Typically, cooling air is provided to cavity 37 through one or more coolant supply channels 39 formed through outer shroud segment 36. As will be seen, such cooling air may then be directed into cooling passages or channels formed through the interior of inner shroud segment 35.

As will be appreciated, each shroud segment 34 may include one or more inner and outer shroud segments 35, 36. Multiple shroud segments 34 may be circumferentially stacked to form a shroud ring disposed just outboard of the row of rotor blades, with each of the shroud segments 34 having one or more inner shroud segments 35 coupled to one or more outer shroud segments 36. Within this assembly, inner shroud segments 35 may be circumferentially stacked so that, together, they surround the row of rotor blades 33, with a narrow radial gap formed therebetween. Given this arrangement, inner shroud segment 35 and outer shroud segment 36 may have an arcuate shape and/or arcuately shaped surfaces.

In regard to general configuration and orientation within turbine 18, inner shroud segment 35 may be described as having an upstream or leading edge 44 that opposes a downstream or trailing edge 46. Inner shroud segment 35 may further include a first circumferential edge 48 that opposes a second circumferential edge 50, with both first and second circumferential edges 48, 50 extending between leading edge 44 and trailing edge 46. Inner shroud segment 35 also is defined between a pair of opposed lateral sides or faces 52, 54 that extend between leading and trailing edges 44, 46 and first and second circumferential edges 48, 50. As used herein, opposed lateral faces 52, 54 of inner shroud segment 35 include an outboard face 52 and inboard face 54. As will be appreciated, outboard face 52 is directed toward outer shroud segment 36 and/or cavity 37 that may be formed between inner shroud segment 35 and outer shroud segment 36, while inboard face 54 is directed toward hot gas path 38 and, thereby, defines an outer radial boundary thereof. Inboard face 54 may be substantially planar except for smooth gradual curvature along the circumferential direction 32, i.e., between first and second circumferential edges 48, 50.

Positioned as it is about the central axis of turbine 18, inner shroud segment 35 may be described relative to axial, radial and circumferential directions 30, 31, 32. Thus, opposed leading and trailing edges 44, 46 are offset in the axial direction 30. As used herein, the distance of this offset in the axial direction 30 is defined as the width of inner shroud segment 35. Additionally, opposed first and second circumferential edges 48, 50 of inner shroud segment 35 are offset in the circumferential direction 32. As used herein, the distance of this offset in the circumferential direction 32 is defined as the length of inner shroud segment 35. Finally, opposed outboard and inboard faces 52, 54 of inner shroud segment 35 are offset in the radial direction 31. As used herein, the distance of this offset in the radial direction 31 is defined as the height of inner shroud segment 35.

As also shown in FIG. 2, inner shroud segment 35 may include a cooling configuration in which cooling channels 59 receive and direct a coolant through its interior. Such cooling channels 59 may be oriented in different directions and disposed within and through various regions of inner shroud segment 35 in order to satisfy the cooling requirements of the component. Thus, for example, such cooling channels 59 may extend axially, circumferentially, and/or radially across the width, length, and/or height, respectively, of inner shroud segment 35. As also shown, cooling channels 59 may extend lengthwise between an inlet 62 and outlet 63. As will be appreciated, inlet 62 may connect cooling channel 59 to a supply of coolant, such as the supply within cavity 37, while outlet 63 is positioned to expel used coolant from an exterior surface of inner shroud segment 35, such as, for example, outboard and inboard faces 52, 54, circumferential edges 48, 50, leading edge 44, or, as depicted, trailing edge 46.

With references now to FIGS. 3 through 7, exemplary cooling configurations of the present disclosure will be described in relation to an exemplary hot gas path component, i.e., inner shroud segment 35. As will be seen, the present disclosure includes specially configured cooling channels for receiving and directing a coolant through the interior of such hot gas path components for improved performance.

For the purposes of describing exemplary embodiments of the present disclosure, it will first be helpful to define certain surfaces and regions of the hot gas path component for later reference. With specific reference to FIG. 3, a side cross-sectional view of a simplified inner shroud segment 35 is presented and will be used for this purpose. It should be understood, however, that these definitions may be applied generally to other hot gas path components and are not limited to exemplary inner shroud segment 35. Thus, as used herein, the hot gas path component is described as having a target exterior surface 71 and target interior region 72, which, as will be appreciated, represent a surface area and interior region, respectively, that are targeted for cooling via the present cooling configurations. For example, in the case of inner shroud segment 35, target exterior surface 71 is an exterior surface that is exposed to high operating temperatures, such as, inboard face 54 that is directed toward hot gas path 38. An opposing exterior surface opposes target exterior surface 71 across the hot gas path component. In the case of inner shroud segment 35, opposing exterior surface is outboard face 52, which is directed toward outer shroud segment 36 and cavity 37. Target interior region 72 is the interior region of inner shroud segment 35 that resides adjacent to target exterior surface 71. For example, as demarcated within dotted line 73, target interior region 72 may be an interior region defined within a predetermined distance 74 of target exterior surface 71, where predetermined distance 74 is taken normal to target exterior surface 71. As will be discussed more below, FIG. 3 also shows a type of cooling channel, a first channel type 60, that provides cooling to target interior region 72. As will be seen, first channel type 60 is a cooling channel that includes a path extending through target interior region 72. As provided herein, the path that first channel type 60 defines through target interior region 72 is one that maintains at least a minimum distance from target exterior surface 71, which will be referred to herein as a "predetermined minimum offset 76".

With specific reference now to FIGS. 4 and 5, an exemplary interior cooling configuration of the present disclosure is illustrated, which includes a pair of operably connected cooling channels, which, together, will be referred to herein as a "channel pairing 66". As will be seen, channel pairing 66 is defined herein to include two types of cooling channels: a first type, which was just introduced above in relation to FIG. 3 as a "first channel type 60"; and a second type, which will be referred to herein as "second channel type 61".

As used herein, first channel type 60 is defined as a continuous flow channel because, as indicated, this type of channel extends lengthwise between an inlet 62 and an outlet 63. First channel type 60 includes at least a section that extends through and is disposed within target interior region 72, which will be referred to herein as "target section 82". As indicated, target section 82 extends lengthwise between a first end 83 and second end 84, defined between positions at which first channel type 60 enters and leaves, respectively, the target interior region 72. As more clearly shown in FIG. 5, first channel type 60 further includes lateral ports 85 spaced lengthwise on target section 82, i.e., between first and second ends 83, 84 of target section 82. As stated, target section 82 of first channel type 60 defines a path within target interior region 72 that maintains at least a distance, referenced herein as a predetermined minimum offset 76, from target exterior surface 71. According to certain embodiments, target section 82 extends along a path that is approximately parallel to target exterior surface 71. That is, target section 82 of first channel type 60 may extend in spaced relation to target exterior surface 71, where the distance that target section 82 maintains from target exterior surface 71 being equal to or greater than predetermined minimum offset 76.

Second channel type 61, as used herein, is defined as a non-continuous flow channel because, as shown, it extends lengthwise between a dead-end disposed at a first end 93 and a dead-end disposed at a second end 94. Unlike first channel type 60, second channel type 61 includes sections along its length at which it extends nearer to target exterior surface 71 than the predetermined minimum offset 76. According to exemplary embodiments, second channel type 61 defines a path within target interior region 72 that is variable or winds between what will be referred to as "valleys 95" and "peaks 96", which may be spaced along the length of second channel type 61, i.e., between first and second ends 93, 94. As illustrated, at valleys 95, second channel type 61 draws closer to target exterior surface 71 so that it resides a distance from target exterior surface 71 that is less than predetermined minimum offset 76. At peaks 96, second channel type 61 resides a distance from target exterior surface that is greater than at valleys 95. According to certain embodiments, at peaks 96, second channel type 61 resides a distance from target exterior surface 71 that is greater than predetermined minimum offset 76.

The exact path of second channel type 61 may vary. According to certain embodiments, second channel type 61 has a winding path that smoothly transitions or curves between alternating valleys 95 and peaks 96. For example, according to certain embodiments, the path of second channel type 61 is shaped like a sinusoidal wave. In such cases, it will be appreciated, each of valleys 95 represent a low point on the sinusoidal wave while of peaks 96 represents a high point on the sinusoidal wave.

Second channel type 61 may include lateral ports 97 spaced lengthwise between first end 93 and second end 94. As will be seen, lateral ports 97 of second channel type 61 may connect to respective ones of the lateral ports 85 of first channel type 60. Further, according to exemplary embodiments, lateral ports 97 of second channel type 61 are positioned at peaks 96 of second channel type 61. Cross channels 99 may be provided that extend between and connect lateral ports 85 of first channel type 60 to respective ones of the lateral ports 97 of second channel type 61. Each of the cross channels 99 may be aligned approximately perpendicular to the lengthwise axes of first and second channel types 60, 61. As used herein, the lengthwise axis of the second channel type 61 is an axis centered in the winding path defined by second channel type 61.

Dead-ends at ends 93, 94 represent lengthwise termination points of second channel type 61. Each of the dead-ends of second channel type 61 may be defined by solid, impervious material or structure that prevents gaseous coolant from escaping from second channel type 61. More generally, except for lateral ports 97 of second channel type 61 that allow fluid communication with first channel type 60, solid impervious structure of inner shroud segment 35 fully encloses second channel type 61 such that fluid communication is prevented between second channel type 61 and any other interior channels defined within inner shroud segment 35 or any region exterior to inner shroud segment 35. According to preferred embodiments, second channel type 61 is narrower than first channel type 60. For example, the cross-sectional flow area through second channel type 61 may be less than 60% of the cross-sectional flow area through first channel type 60.

As stated, first channel type 60 may be a continuous flow channel that extends lengthwise between an inlet and outlet, for example, inlet 62 and outlet 63. According to preferred embodiments, inlet 62 of first channel type 60 is formed on an exterior surface of inner shroud segment 35 for receiving a supply of coolant. Outlet 63 of first channel type 60 may be formed on an exterior surface of inner shroud segment 35 for expelling that coolant once it has traveled through first channel type 60. Thus, as illustrated, the path defined by first channel type 60 may extend beyond the section contained within target interior region 72 (i.e., target section 82). According to exemplary embodiments, first channel type 60 extends longitudinally between non-overlapping and sequential sections, which include an upstream section 101, the target section 82, and a downstream section 102. As illustrated in FIG. 4, upstream section 101 of first channel type 60 extends between inlet 62 and target section 82, while downstream section 102 of first channel type 60 extends between target section 82 and outlet 63. According to exemplary embodiments, the exterior surface on which inlet 62 of first channel type 60 is disposed is a surface defined within cavity 37. According to exemplary embodiments, the exterior surface on which outlet 63 of first channel type 60 is disposed may be first and second circumferential edges 48, 50.

Thus, according to exemplary embodiments, cooling configurations of the present disclosure include a channel pairing 66 in which first channel type 60 is operably paired with second channel type 61, where both include at least a portion or section defined through and disposed within target interior region 72 of a hot gas path component. As illustrated, first channel type 60 and second channel type 61 of channel pairing 66 may have a side-by-side arrangement, i.e., the pairing extends lengthwise along axes that are substantially parallel to each other. First channel type 60 and second channel type 61 of channel pairing 66 may be oriented so that they extend lengthwise in the circumferential direction or, put another way, along the length of inner shroud segment 35. In such cases, first channel type 60 and second channel type 61 each may extend across a majority of the length of inner shroud segment 35, such as, across at least 50% of the length of inner shroud segment 35. According to certain embodiments, first channel type 60 and second channel type 61 each may extend across at least 75% of the length of inner shroud segment 35. According to other embodiments, channel pairing 66 may extend approximately in the axial direction or, put another way, along the width of inner shroud segment 35. In such cases, first channel type 60 and second channel type 61 each may extend across a majority of the width of inner shroud segment 35, such as, across at least 50% or 75% of the width of inner shroud segment 35.

It should be understood that, while the following description is primarily focused on describing the characteristics of a single one of the channel pairings 66, cooling configurations of the present disclosure may typically include a plurality of such channel pairings 66, as shown in FIG. 5. For example, cooling configurations of the present invention may include multiple channel pairings 66, such as 5, 10 or 20 or more, each of which having a first channel type 60 operably paired with second channel type 61. Other configurations having more or less channel pairings 66 are also possible. As shown in FIG. 5, though other configurations are also possible, the multiple channel pairings 66 may be arranged in a parallel configuration.

FIG. 6 is an enhanced cross-sectional side view showing an exemplary channel pairing 66 in a hot gas path component 110 according to an initial state, while FIG. 7 provides that same view during an exemplary operational state. As shown in FIG. 6, in the initial state, the solid impervious structure of the hot gas path component 110 terminates second channel type 61 at dead-ends and otherwise encloses second channel type 61 (except the connections made with first channel type 60 via lateral ports 97). Thus, as intended in the initial state, coolant flow through second channel type 61 is generally limited.

As shown in FIG. 7, at some point due to accruing degradation to hot gas path component 110, a portion 121 of hot gas path component 110 is removed, which exposes or opens second channel type 61. For example, in regard to inner shroud segment 35, such degradation may be caused by oxidation or the rubbing that occurs with rotor blades. As will be appreciated, this opening diverts a portion of the coolant flowing through first channel type 60 to the degraded area. The cross-sectional flow area of the second channel type 61 may be less than that of the first channel type 60 so that the diverted flow is metered or limited, resulting in coolant flow being maintained within first channel type 60 also. The diverted coolant protects the degraded area by lowering temperatures and, thereby, prevents further degradation or, at least, slows the rate at which such further degradation progresses. The curving or winding shape of second channel type 61 also provides enhanced convective cooling to the areas adjacent to the degraded area as coolant flow through second channel type 61 increases due to the opening caused by degradation. Further, as the opening caused by the degradation grows larger, more coolant is diverted to the affected area so to enhance protection. In this way, a passive prevention system is created that uses coolant efficiently by targeting those regions within the hot gas path component that have the greatest need.

With specific reference now to FIGS. 8 through 11, an alternative interior cooling configuration of the present disclosure is shown. For convenience, in describing this configuration, components and elements that correspond to those already identified in preceding figures are identified with similar reference numerals, but only particularly discussed as necessary for an understanding of the present embodiments. It should be understood that, unless otherwise stated, such corresponding components and elements may include any of the variations and characteristics described above in relation to FIGS. 1 through 7.

The alternative cooling configurations of FIGS. 8 through 11 may include first and second channel types 60, 61, however, these channels are not directly connected as described above in relation to FIGS. 4 through 7. Instead, second channel type 61 includes lateral ports 97 spaced lengthwise between first and second end 93, 94 that connect to surface ports 125. That is, lateral ports 97 of second channel type 61 do not connect to first channel type 60, but, instead, connect via cross channels 99 to respective ports formed through an exterior surface of inner shroud segment 35, i.e., surface ports 125. According to exemplary embodiments, surface ports 125 may be formed on the surface of the component that is opposite target exterior surface 71. Thus, for inner shroud segment 35, surface ports 125 may be formed on outboard face 52. Surface ports 125 may be located on outboard face 52 to that each connects to cavity 37. In this way, surface ports 125 may reside at substantially the same pressure level as that of cavity 37. At some point, as shown in FIG. 11, this may change because of an opening through inboard face 54 that is caused by increasing levels of degradation. Until this occurs, flow through the second channel type 61 may be negligible.

Figure 8:
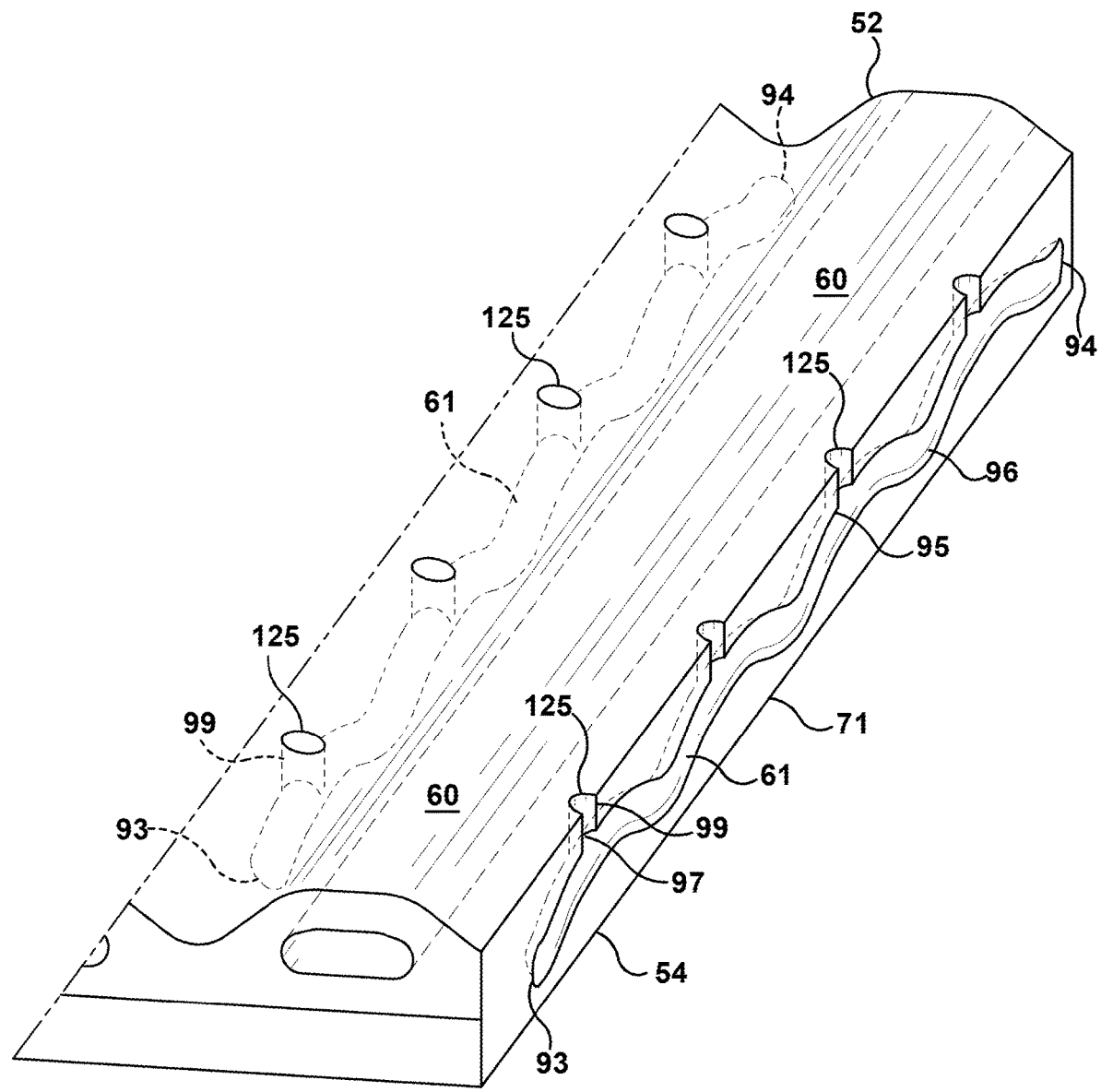
FIG. 8 is perspective cross-sectional view with transparent elements of an inner shroud segment that includes an alternative cooling configuration in accordance with the present disclosure.
Figure 9:
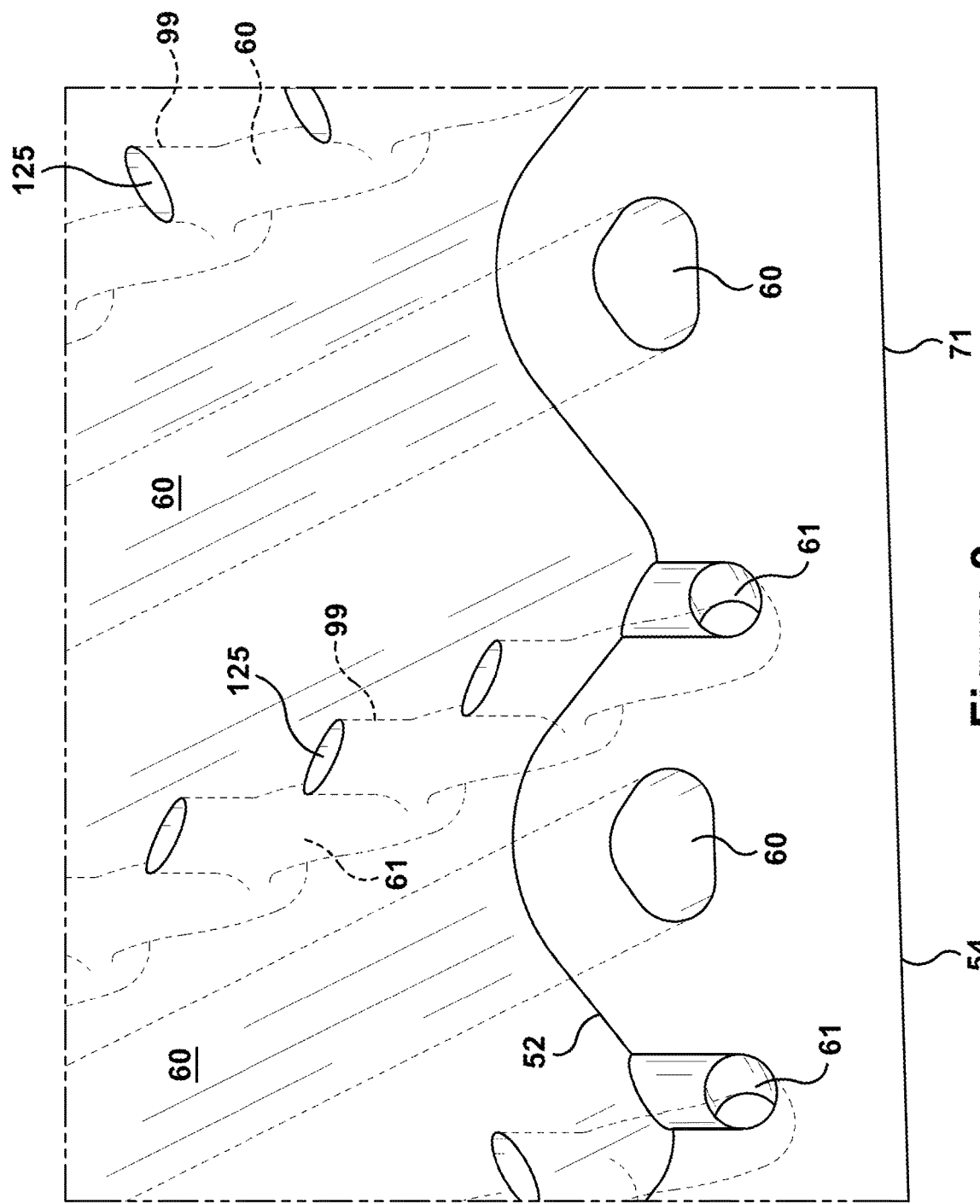
FIG. 9 is an enhanced view of the cooling configuration of FIG. 8.

The cooling configurations of FIGS. 8 through 11 may include one or more channels of second channel type 61. As shown in FIGS. 8 and 9, such cooling configurations may include one or more channels of first channel type 60, or, as shown in FIGS. 10 and 11, exemplary embodiments may include only channels of second channel type 61. As indicated, second channel type 61 may extend between outboard face 52 and inboard face 54 of inner shroud segment 35, where inboard face 54 represent target exterior surface 71. In the manner described above, second channel type 61 may include alternating sections along its length at which it extends nearer to target exterior surface 71 and then draws farther away from it. Specifically, second channel type 61 may define a winding path that includes valleys 95 and peaks 96, wherein, at valleys 95, second channel type 61 resides closer to target exterior surface 71, while, at peaks 96, second channel type 61 resides further away from target exterior surface 71.

In use, as shown in FIG. 11, accruing degradation to inner shroud segment 35 may remove a portion 121 from inboard face 54, which exposes or opens second channel type 61. Such degradation may be caused by oxidation or the rubbing that occurs with rotor blades. As will be appreciated, the pressure differential between cavity 37 and the opening forces coolant from cavity 37 toward the degraded area. The coolant then protects the degraded area by lowering temperatures and, thereby, prevents further degradation or, at least, slows the rate at which such further degradation progresses. In this way, a passive prevention system is created that uses coolant efficiently by targeting those regions within the hot gas path component that have the greatest need.

The cooling configurations of the present disclosure, including each of the configurations of FIGS. 4 through 11, have been found to cool hot gas path components, such as stationary shrouds, using less coolant than conventional cooling configurations, resulting in reduced costs associated with cooling and greater engine efficiency, while also preventing or slowing degradation that might otherwise result in costly outages or repair costs. As will be appreciated, the cooling configurations of the present disclosure may be formed in a hot gas path component, such as inner shroud segment, via any conventional manufacturing technique, including electrical discharge machining, drilling, casting, additive manufacturing, a combination thereof, or any other technique.

As one of ordinary skill in the art will appreciate, the many varying features and configurations described above in relation to the several exemplary embodiments may be further selectively applied to form the other possible embodiments of the present disclosure. For the sake of brevity and considering the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present That which is claimed:

1. A hot gas path component for use in a turbine of a gas turbine engine, the hot gas path component comprising:
a target exterior surface;
an opposing exterior surface that opposes the target exterior surface across the hot gas path component;
surface ports formed through the opposing exterior surface;
a target interior region defined adjacent to the target exterior surface by a predetermined distance taken normal to the target exterior surface; and
a cooling configuration that comprises a second channel type;
wherein the second channel type includes:
a flow channel that extends lengthwise between a first dead-end disposed at a first end and a second dead-end disposed at a second end;
lateral ports spaced lengthwise between the first end and the second end of the second channel type, the lateral ports of the second channel type connecting to respective ones of the surface ports; and
a path defined through the target interior region that is variable between valleys and peaks that are spaced lengthwise between the first end and second end of the second channel type, wherein the second channel type resides closer to the target exterior surface at the valleys than the peaks.

2. The hot gas path component of claim 1, wherein the path of the second channel type comprises a sinusoidal wave in which each of the valleys comprises a low point on the sinusoidal wave and each of the peaks comprises a high point on the sinusoidal wave.

3. The hot gas path component of claim 2, wherein the cooling configuration of the hot gas path component comprises multiple ones of the second channel type, the multiple ones of the second channel type extend lengthwise along axes that are substantially parallel.

4. The hot gas path component of claim 3, wherein the lateral ports of the second channel type are positioned at the peaks of the path defined by the second channel type.

5. The hot gas path component of claim 4, wherein each of the dead-ends at the first and second ends of the second channel type comprises a solid impervious structure that marks a lengthwise termination point for the second channel type.

6. The hot gas path component of claim 5, further comprising cross channels that extend between and connect the lateral ports of the second channel type to the respective ones of the surface ports; and
wherein each of the cross channels is aligned approximately perpendicular to the lengthwise axes of the second channel type.

7. The hot gas path component of claim 5, wherein the hot gas path component comprises a shroud segment, the shroud segment comprising a cavity formed between an inner shroud segment and an outer shroud segment; wherein the inner shroud segment comprises opposed inboard and outboard faces, wherein the outboard face is directed toward the cavity; wherein: the target exterior surface comprises the inboard face of the inner shroud segment; and the opposing exterior surface comprises the outboard face of the inner shroud segment.

8. The hot gas path component of claim 7, wherein the outer shroud segment comprises a coolant supply channel that includes an outlet configured to deliver pressurized coolant to the cavity; and
wherein each of the surface ports is formed through a portion of the outboard face forming a boundary of the cavity.

9. The hot gas path component of claim 8, wherein the cooling configuration comprises a channel pairing in which a first channel type is paired with the second channel type; wherein the first channel type comprises: a continuous flow channel that extends lengthwise between an inlet and an outlet;
a target section that extends through and is disposed within the target interior region, the target section of the first channel type extending lengthwise between a third end and a fourth end; a first channel path defined through the target interior region that is offset from the target exterior surface by a distance that is greater than a predetermined minimum offset; wherein, at each of the valleys, the second channel type resides at a distance from the target exterior surface that is less than the predetermined minimum offset.

10. The hot gas path component of claim 9, wherein the cooling configuration of the hot gas path component comprises multiple ones of the channel pairing; and
wherein the first channel type and the second channel type of the channel pairing are arranged side-by-side so to extend lengthwise along axes that are substantially parallel.

11. The hot gas path component of claim 10, wherein the inlet of the first channel type is disposed within the cavity; and wherein the outlet of the first channel type is disposed on one of a first circumferential edge and a second circumferential edge of the inner shroud segment; and wherein the multiple ones of the channel pairing are arranged parallel to each other.

12. A turbine of a gas turbine engine, wherein the turbine comprises an inner shroud segment that includes:
a target exterior surface;
a target interior region defined adjacent to the target exterior surface by a predetermined distance taken normal to the target exterior surface; and
a cooling configuration that comprises a channel pairing in which a first channel type is paired with a second channel type;
wherein the first channel type comprises:
a continuous flow channel that extends lengthwise between an inlet and an outlet;
a target section that extends through and is disposed within the target interior region, the target section of the first channel type extending lengthwise between a first end and a second end;
first lateral ports spaced lengthwise between the first end and the second end of the target section; and
a first path defined through the target interior region that is offset from the target exterior surface by a distance that is greater than a predetermined minimum offset;
wherein the second channel type comprises:
a second flow channel that extends lengthwise between a first dead-end disposed at a third end and a second dead-end disposed at a fourth end;
second lateral ports spaced lengthwise between the third end and the fourth end of the second channel type, the lateral ports of the second channel type connecting to respective ones of the lateral ports of the first channel type; and
a second path defined through the target interior region that is variable between valleys and peaks that are spaced lengthwise between the third and fourth ends of the second channel type; wherein:

the second channel type resides closer to the target exterior surface at the valleys than at the peaks; and at each of the valleys, the second channel type resides a distance from the target exterior surface that is less than the predetermined minimum offset.

13. The turbine according to claim 12, wherein the turbine comprises a stationary shroud ring that includes circumferentially stacked shroud segments, the shroud segments comprising an outer shroud segment that is positioned outboard of the inner shroud segment; wherein the second path of the second channel type comprises a sinusoidal wave in which each of the valleys comprises a low point on the sinusoidal wave and each of the peaks comprises a high point on the sinusoidal wave; wherein the target exterior surface comprises an exterior surface of the inner shroud segment that is exposed to a hot gas path defined through the turbine; and wherein the target section of the first channel type is approximately parallel to the target exterior surface.

14. The turbine according to claim 12, wherein a cross-sectional flow area of the second channel type is less than a cross-sectional flow area of the first channel type; wherein the turbine comprises:

a stationary shroud ring that includes circumferentially stacked shroud segments, the shroud segments comprising an outer shroud segment that is positioned outboard of the inner shroud segment; and a row of circumferentially stacked rotor blades, wherein the shroud ring is formed about the row of rotor blades.

15. The turbine according to claim 14, wherein the second path of the second channel type comprises a winding path that smoothly curves between alternating ones of the valleys and the peaks; and wherein the cooling configuration of the inner shroud segment comprises multiple ones of the channel pairing.

16. The turbine according to claim 15, wherein, except for the second lateral ports of the second channel type that fluidly communicate with corresponding ones of the first lateral ports of the first channel type, a first solid impervious structure of the inner shroud segment encloses the second channel type so that fluid communication is prevented between the second channel type and: any other interior channels formed within the inner shroud segment; and any region exterior to the inner shroud segment; and wherein the multiple ones of the channel pairing comprise a number of at least eight;

wherein the second lateral ports of the second channel type are positioned at the peaks of the path defined by the second channel type; and wherein the first channel type and the second channel type of the channel pairing are arranged side-by-side so to extend lengthwise along axes that are substantially parallel.

17. The turbine according to claim 15, wherein, at each of the peaks, the second channel type resides a distance from the target exterior surface that is greater than the predetermined minimum offset;

wherein the inlet and outlet of the first channel type is formed on an exterior surface of the inner shroud segment; and wherein each of the dead-ends at the third and fourth ends of the second channel type comprises a second solid impervious structure that marks a lengthwise termination point for the second channel type.

18. The turbine according to claim 17, wherein the shroud segment comprises a cavity formed between the inner shroud segment and the outer shroud segment; wherein the inner shroud segment comprises: opposed leading and trailing edges and opposed first and second circumferential edges extending between the leading and trailing edges; and opposed inboard and outboard faces extending between the leading and trailing edges and the first and second circumferential edges, the inboard face being directed in an inboard direction toward a hot gas path and the outboard face being directed in an outboard direction.

19. The turbine according to claim 18, wherein: cross channels extend between and connect the first lateral ports of the first channel type to the respective ones of the second lateral ports of the second channel type;

a coolant supply channel is formed through an interior of the outer shroud segment for delivering a pressurized coolant to the cavity;

wherein: the inlet of the first channel type is disposed on the outboard face for fluid communication with the cavity; and the outlet of the first channel type is disposed on one of the first and second circumferential edges.

20. The turbine according to claim 19, wherein the turbine comprises a center axis relative to which an axial direction, radial direction, and circumferential direction are defined; wherein the inner shroud segment is oriented such that:

the leading and trailing edges are offset in the axial direction, with the offset therebetween defining a width of the inner shroud segment;

the first and second circumferential edges are offset in the circumferential direction, with the offset therebetween defining a length of the inner shroud segment; and the lateral faces are offset in the radial direction, with the offset therebetween defining a height of the inner shroud segment;

wherein the first channel type and the second channel type extend lengthwise approximately in the circumferential direction;

wherein the first channel type and the second channel type each extends across at least 50% of the length of the inner shroud segment; and wherein the cross-sectional flow area of the second channel type is less than 60% of the cross-sectional flow area of the first channel type.

* * * * *